(12) United States Patent
Johnson

(10) Patent No.: US 12,295,805 B2
(45) Date of Patent: *May 13, 2025

(54) ENDODONTIC INSTRUMENT WITH ENLARGED CHIP SPACE AND REDUCED TORQUE STRENGTH

(71) Applicant: William B. Johnson, Tulsa, OK (US)

(72) Inventor: William B. Johnson, Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/301,723

(22) Filed: Apr. 17, 2023

(65) Prior Publication Data

US 2023/0293262 A1    Sep. 21, 2023

Related U.S. Application Data

(63) Continuation of application No. 17/688,446, filed on Mar. 7, 2022, now Pat. No. 11,628,042.

(51) Int. Cl.
*A61C 5/42*        (2017.01)

(52) U.S. Cl.
CPC ....................... *A61C 5/42* (2017.02)

(58) Field of Classification Search
CPC ........................................................ A61C 5/42
See application file for complete search history.

(56) References Cited

U.S. PATENT DOCUMENTS

| | | | | |
|---|---|---|---|---|
| 4,538,989 A * | 9/1985 | Apairo, Jr. | ............... | A61C 3/02 433/102 |
| 5,017,138 A | 5/1991 | Schilder | | |
| 5,692,902 A * | 12/1997 | Aeby | ................ | A61C 5/42 433/102 |
| 5,752,825 A * | 5/1998 | Buchanan | ................ | A61C 5/42 433/32 |
| 8,408,901 B2 * | 4/2013 | Buchanan | ................ | A61C 5/42 433/102 |
| 9,681,928 B1 * | 6/2017 | Maupin | ................ | A61C 5/42 |
| 2004/0058297 A1 * | 3/2004 | Danger | ................ | A61C 5/42 433/102 |
| 2012/0208146 A1 * | 8/2012 | Mordeniz | .............. | B23D 77/12 433/102 |
| 2014/0004480 A1 | 1/2014 | Breguet | | |
| 2020/0229899 A1 | 7/2020 | Cakir et al. | | |

FOREIGN PATENT DOCUMENTS

| | | |
|---|---|---|
| DE | 202012012526 U1 | 3/2013 |
| WO | 2017090028 | 6/2017 |

* cited by examiner

*Primary Examiner* — Heidi M Eide
(74) *Attorney, Agent, or Firm* — GableGotwals

(57) ABSTRACT

An endodontic instrument of this disclosure has less torque strength but greater flexibility and enlarged chip space compared to the prior art. In embodiments. only two flutes are spiraled about the instrument's length L to form two non-landed cutting edges between D2 and D16, the cutting edges merging to form a land at about D1. The tip end is rounded. The helical angle α increases from the handle end toward the tip end, a number of spirals per unit length being at least two times greater toward the tip end than toward the handle end, a cross-section of the length L consisting of two convex portions intersecting at each cutting edge or a wave-shape having one concave portion and one convex portion intersecting at each cutting edge, the cross-section occupying less total area than would a same size endodontic instrument having a triangular cross-section and providing greater chip space.

9 Claims, 3 Drawing Sheets

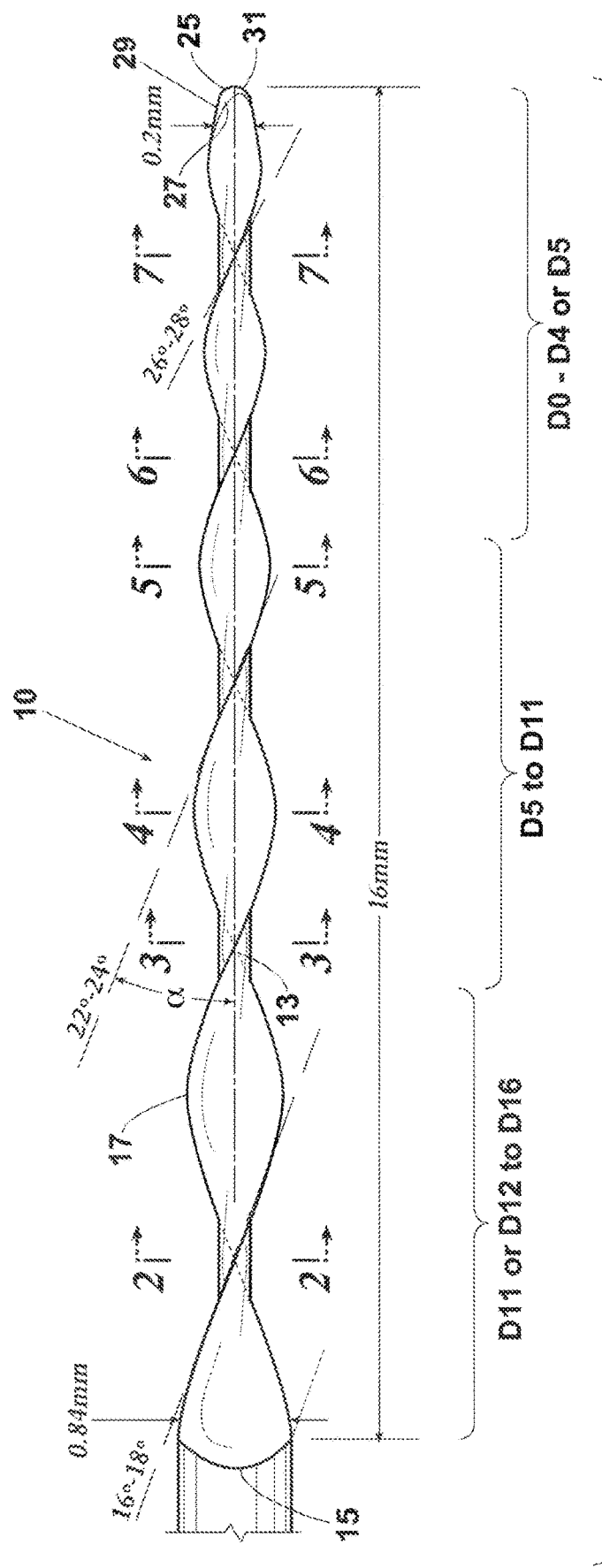

ENDODONTIC INSTRUMENT WITH ENLARGED CHIP SPACE AND REDUCED TORQUE STRENGTH

CROSS REFERENCE TO CO-PENDING APPLICATIONS

This application is a continuation of U.S. application Ser. No. 17/688,446, filed Mar. 7, 2022, the content of which is incorporated by reference herein.

BACKGROUND

This disclosure is in the field of rotary endodontic instruments made of nickel-titanium, or a material with similar properties, and used to clean and shape a root canal. The instrument may be configured as a file or a reamer. See American Association of Endodontists, Glossary of Endodontic Terms (9th Ed.) for a definition of these terms, the content of which is incorporated by reference herein.

Endodontic rotary files fail from either torque or cyclic fatigue. Historically, the vast majority of failures are due to cyclic fatigue. Regardless of the cause, most failures occur within the first 4 mm or 5 mm of the file, which is the apical end of the file. For example, torsional fatigue most often occurs when the tip of the instrument binds in the root canal as the remaining length of the shaft continues to rotate.

The torsional and flexural stiffness of nickel-titanium ("NiTi") endodontic rotary files is discussed in Seung Ho Baek et al., *Comparison of Torsional Stiffness of Nickel-Titanium Rotary Files with Different Geometric Characteristics,* 37 J. Endodontics 1283 (No. 9, September 2011); Antheunis Versluis et al., *Flexural Stiffness and Stresses in Nickel-Titanium Rotary Files for Various Pitch and Cross-sectional Geometries,* 38 J. Endodontics 1399 (No. 10, October 2012); and Alessio Zanza et al., *A Paradigm Shift for Torsional Stiffness of Nickel-Titanium Rotary Instruments: A Finite Element Analysis,* 47 J. Endodontics 1149 (No. 7, July 2021), the content of each is incorporated by reference herein. The cross-sectional geometry of the prior art rotary files discussed include those with a triangular cross section, a skinny rectangle, and a fat rectangle, off-centered, and changing in two dimensions (length and width) along the length of the file.

Prior art file design is primarily a trade-off between torsional strength and flexibility, with increased torsional strength desirable to reduce or eliminate the potential for breakage. Torsional strength can be increased by reducing the pitch (increasing the number of threads or spirals per unit of length) and increasing the cross-sectional areas along the length of the file. The cross-sectional area along the length of prior art files with a triangular cross-section is no less than 40% of the total area of its circle of rotation, and for square or rectangular cross-section no less than 60% of the total area of the circle of rotation. The circle of rotation lies in a plane orthogonal to the longitudinal axis of the file and has a diameter defined by the cutting edges at the cross-section.

Cross-sectional design is "one of the most important parameters that characterizes torsional stiffness . . . because it deeply influences mechanical properties." See Zanza et al. ar 1149. Two instruments with a different cross-sectional shape but the same cross-sectional area can "develop different torsional resistance because of their different geometry." Id. at 1150. "[T]he bigger the mass and volume/mm of the instrument, the more its stiffness increases, and the more its fatigue resistance decreases, causing the instrument to withstand worser with flexural stresses." Id. Therefore, what is needed is an endodontic instrument that has a reduced cross section relative to a triangular cross-section, more flexibility but reduced torque strength, and can still shape a root canal without breaking within the canal.

SUMMARY

Embodiments of an endodontic instrument of this disclosure have a cross-section along its working (bladed or cutting edge) length that provides less torque strength but more flexibility than an endodontic instrument having a triangular-, square-, or rectangular-shaped cross-section. The mass of metal at each cross-section diameter of the instrument is less than that of a triangle-shaped cross-section for a same, corresponding size of endodontic instrument. Additionally, the core diameter of the working length is less than that of the triangular-shaped cross-section.

In embodiments, the cross-section includes only two cutting edges, the cross-section having opposing and convex portions intersecting at each cutting edge or a convex portion intersecting an opposing concave portion at each cutting edge. At each diameter along the working length, the cross-section of the instrument occupies about 20% of the total area A to less than that occupied by a triangle, 25% to less than that occupied by a triangle, 30% to less than that occupied by a triangle, 35% to less than that occupied by a triangle, there being sub-ranges and discrete values within these broader ranges. This reduced cross-sectional area provides an enlarged chip space, thereby allowing the instrument, despite its reduced torque strength, to maintain its integrity and not break during use.

The tip end of an endodontic instrument of this disclosure may be shovel-shaped, the shovel shape beginning at about the D2 diameter, that is, about 2 mm from the tip end, with each cutting edge merging into the core in between the D1 and D0 diameter to form a radial land.

BRIEF DESCRIPTION OF THE DRAWINGS

FIG. 1 is a plan view of an embodiment of an endodontic instrument of this disclosure. The cross-section has opposing and convex portions intersecting at each cutting edge, there being only two cutting edges. The enlarged chip space provided compensates for the reduced torque strength. In embodiments, the helical angle α increases from the proximal end to the distal end as does the number of spirals.

FIGS. 2-7 are cross-section views each taken along their respective section lines of FIG. 1. The cross-section views show the path P of each cutting edge as it ever slightly decreases its distance from the axial centerline.

DEFINITIONS

Figure 8:
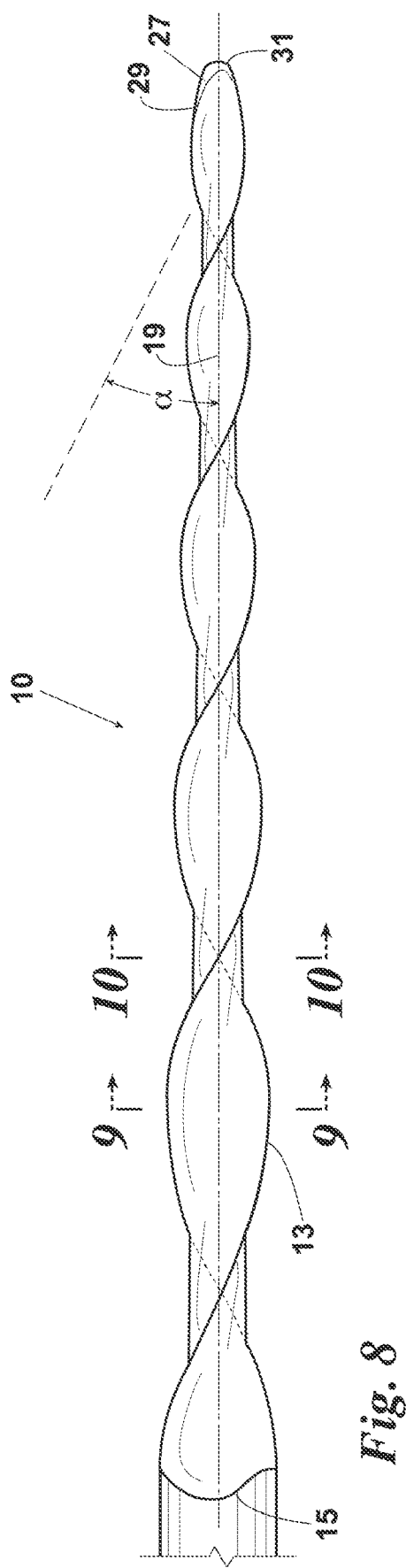
FIG. 8 is a plan view of another embodiment of an endodontic instrument of this disclosure. The cross-section has a convex portion intersecting an opposing concave portion at each cutting edge and provides two sharp edges to help prevent binding between the instrument and the canal wall. The enlarged chip space provided compensates for the reduced torque strength. The helical angle α and number of spirals may vary like that of the instrument of FIG. 1.
Figure 11:
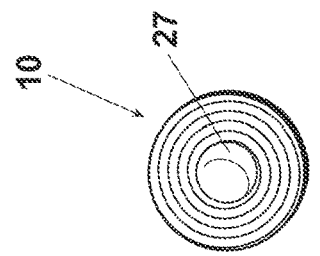
FIG. 11 is an end view of the embodiment of FIG. 1.
Figure 10:
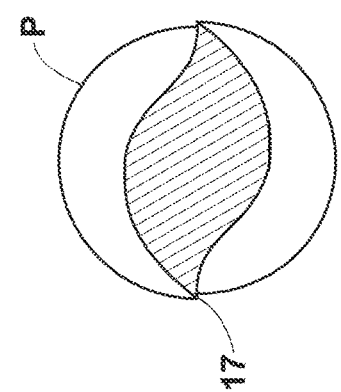
FIGS. 9-10 are cross-section views taken along respective section lines of FIG. 8. The cross-section views show the path P of each cutting edge as it ever slightly decreases its distance from the axial centerline.
Figure 9:
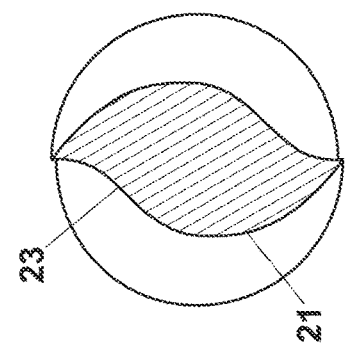
Figure 12:
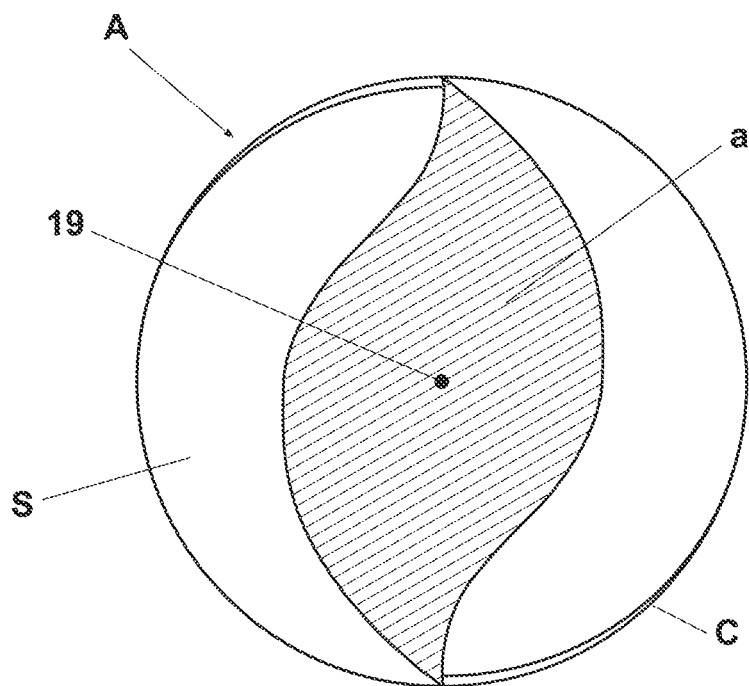
FIG. 12 is cross-section view of the embodiment of FIG. 8, illustrating a circle of rotation and chip space between cutting edges within it.
Figure 13:
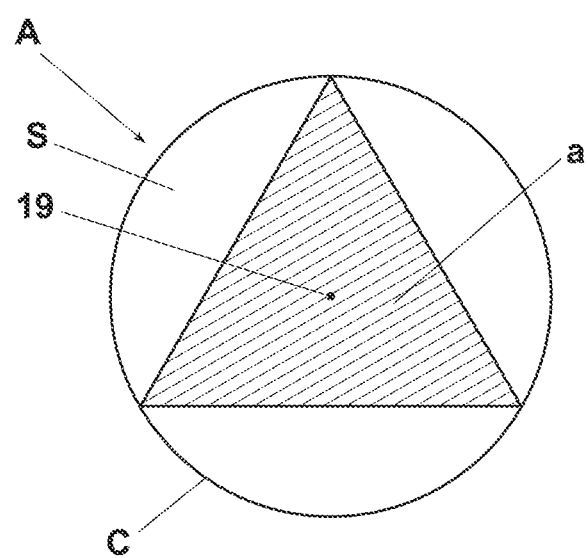
FIG. 13 is a cross-section view of a prior art endodontic instrument having a triangular cross-section and illustrating the circle of rotation and chip space between cutting edges within it. Embodiments of this disclosure provide a greater amount of chip space than does a triangular cross-section.

Total area "A": the area defined by a circle of rotation at each diameter along the working length of the endodontic instrument, $$\Pi R^2 \quad \text{(Eq. 1)}$$

where R is the radius of the circle of rotation.

Circle of Rotation "C": a circle lying in a plane orthogonal to the longitudinal axis of the endodontic instrument and containing a corresponding one of the diameters of the endodontic instrument, the circle of rotation having a diameter defined by a line passing through the longitudinal axis and having as its endpoints the two cutting edges of the endodontic instrument.

Cross-section area "a": the area occupied by the endodontic instrument within the circle of rotation, where A>a. For a triangular cross-section inscribed with a circle of rotation C having a radius R, the area a is $$\frac{3\sqrt{3}}{4}R^2 \quad \text{(Eq. 2)}$$

which, when simplified, is about 1.3 R². Therefore, the percentage of total area A occupied by a triangular cross section is calculated as follows:

$$\frac{\frac{3\sqrt{3}}{4}R^2}{\Pi R^2} \times 100 \text{ or} \quad \text{(Eq. 3)}$$

$$\frac{3\sqrt{3}}{4\Pi} \times 100 \quad \text{(Eq. 4)}$$

which, when simplified, is about 41%. For a square cross-section, A becomes:

$$2R^2 \quad \text{(Eq. 5)}$$

Therefore, a triangular cross-section occupies less space than does a square (or rectangular) cross-section:

$$2R^2 - \frac{3\sqrt{3}}{4}R^2 = \Delta \quad \text{(Eq. 6)}$$

which, when simplified is about 0.7 R².

Chip space "S": the area not occupied by the endodontic instrument within the circle of rotation, where A=a+S. For a triangular cross section, the total chip space S is $$\Pi R^2 - \frac{3\sqrt{3}}{4}R^2 \text{ or} \quad \text{(Eq. 5)}$$

$$R^2\left(\Pi - \frac{3\sqrt{3}}{4}\right) \quad \text{(Eq. 6)}$$

The percentage of chip space S within the circle of rotation C being about 59%, calculated as follows:

$$\left(1 - \frac{3\sqrt{3}}{4\Pi}\right) \times 100 \quad \text{(Eq. 7)}$$

that is 100%-41%. The chip space "s" between adjacent cutting edges is $$\frac{S}{n} \quad \text{(Eq. 8)}$$

where n is the total number of cutting edges. For example, in embodiments of this disclosure, s=S/2. For a triangular cross-section, the chip space s between adjacent cutting edges is S/3:

$$\frac{1}{3}R^2\left(\Pi - \frac{3\sqrt{3}}{4}\right) \quad \text{(Eq. 9)}$$

which, when simplified, is about 0.61R². For a triangular cross-section, the percentage of chip space s occupying the circle of rotation C is about 17% (i.e. 59%/3).

DETAILED DESCRIPTION

Referring to the drawings, embodiments of an endodontic instrument 10 of this disclosure have a cross-section that provides less torque strength but more flexibility than endodontic instruments of similar size, cutting angle, and material having a triangular-, square-, or rectangular-shaped cross-section. The endodontic instrument 10 of this disclosure includes a cross-section 11 along the length "L" between its handle (proximal) end 15 and tip (distal) end 25 that occupies less of the total area "A" at each diameter than that occupied by a triangular cross-section.

In embodiments, the cross-section 11 at each diameter D1 to D16 of the instrument 10 occupies less of the total area A than would a triangular cross-section at each diameter, where D1 is the diameter 1 mm from the tip end 25 and D16 is the diameter 16 mm from the tip end 25, there being intermediate diameters therebetween. This reduced cross-sectional area "a" provides an enlarged chip space "S". In some embodiments, the cross-sectional area "a" occupies up to 39% to 40% of the total area A at the handle end 15 and about 20%-25% at the tip end 25, the middle third being about 30%-35%. The chip space "s" between adjacent cutting edges 17 is greater than that between adjacent cutting edges of a prior art endodontic instrument having a triangular cross-section.

The endodontic instrument 10, which can be made of nickel-titanium and have uniform taper along its entire blade or cutting length L, may be configured as a file or reamer. The instrument 10 may be configured for right-hand rotation or for left-hand reciprocation. When in use, the instrument 10 shapes a root canal. Instrument size may be in range of 10 to 35, there being subranges within this broader range. In some embodiments, the instrument size is 15, 20, 25 or 30.

In embodiments, only two helical-shaped flutes 13 spiral about the length L to form only two cutting blades or edges 17. Embodiments do not include three or more cutting blades or edges. The cutting edges 17 are non-landed other than for a portion located between the tip end 25 and D1. The cutting edges 17 may have a slightly negative rake angle or substantially neutral rake angle. The instrument's axis of rotation during use may be the same as its longitudinal axis 19. The cross-section 11 of the instrument 10 may be American football-shaped (prolate spheroid) having two opposing convex portions 21 intersecting at each cutting edge 17 or it may be wave-shaped, having a convex portion 21 intersecting an opposing concave portion 23 at each cutting edge 17.

Compared to prior art endodontic instruments, the cutting edges 17 of this disclosure spiral over more of the cutting length L than do prior art instruments. In embodiments, the length L is at least 16 mm and includes cutting edges along its entirety. The pitch—i.e., the distance between cutting edges 17 along the length L—is larger at the handle end 15 than at the tip end 25, there being more spirals put unit length toward the tip end 25 than toward the handle end 15. The total number of spirals along the length L may be in a range of 6 to 8, the length L being 16 mm, the instrument 10 being 25 mm in length from the handle to the tip end 25. Depending on instrument size, the first 4 or 5 mm (D0 to D4 or D5) of the length L has more spirals that that of the last 4 of 5 mm (D11 or D12 to D16), with the number of spirals in the intermediate 6 to 8 mm providing a transition between the two.

In embodiments, the helical angle α of the spiral increases from the handle end 15 to the tip end 25. The helical angle α at the tip end 25 may be in a range of 40% to 75% greater than that at the handle end 15. For example, the helical angle α may in a range of 16° to 18° at or toward the handle end 15, in a range of 26° to 30° at the tip end 25, and may be in a range of 22° to ° 24° in between. Similar to the number of spirals, the increased helical angle α may be greater in the first 4 to 5 mm.

The tip end 25 of the instrument is shovel-shaped, the shovel shape beginning at about D2. The shovel shape includes slightly curved sides 29 and a rounded tip 31. Between the D1 diameter and the tip end 25, the cutting edges 17 merge with the central core to form a radial land 27. The radial land 27 results from keeping a constant center core along the entire length L of the instrument 10. Therefore, there is no "sharp" transition angle of the cutting edges as would be understood by persons of skill in the art transitioning into the tip end 25.

While embodiments have been described, the scope of the invention is defined by the following claims, the elements of which are entitled to their full range of equivalents.

What is claimed:

1. An endodontic instrument comprising:
   a tapered shaft having a length (L) with diameters D0 to D16 along the length (L), where D0 is a diameter at a tip end of the endodontic instrument and D16 is a diameter 16 mm from the tip end;
   only two flutes spiraled about the length (L) at a helical angle (α) to form two cutting edges, the two cutting edges being non-landed between D2 and D16 and merging after D2 to form a land toward the tip end, the two cutting edges further forming a shovel blade beginning at D2 and ending at the tip end, the shovel blade having curved sides and the tip end being an end of the shovel blade and rounded;
   a cross-section of the tapered shaft selected at each diameter D1 to D16 occupying less total area than 1.3 $(Di/2)^2$, where i is an integer between 1 and 16, the cross-section lying in a plane orthogonal to a longitudinal axis of the endodontic instrument;
   the cross-section of the tapered shaft from D2 to D16 is asymmetrical wave-shape, the asymmetrical wave shape consisting of two waves opposing one another and intersecting at each cutting edge, each of the two waves having one concave portion and one convex portion, the one concave portion being shorter than the one convex portion.

2. The endodontic instrument of claim 1, wherein the helical angle (α) increases from a handle end toward the tip end.

3. The endodontic instrument of claim 2, wherein the helical angle (α) at the tip end is in a range of 10° to 12° greater than toward the handle end.

4. The endodontic instrument of claim 1, wherein a number of spirals per unit length increases toward D0 from D16.

5. The endodontic instrument of claim 1, wherein a number of spirals per unit length is greater between D0 and D5 than the number of spirals per unit length between D11 and D16.

6. The endodontic instrument of claim 1, wherein the cross-section has a circle of rotation having a diameter, wherein the two cutting edges lie on the diameter of the circle of rotation.

7. The endodontic instrument of claim 1, wherein, the endodontic instrument is configured for right-hand rotation.

8. The endodontic instrument of claim 1, wherein the endodontic instrument is in an ISO 3630-1 size range of 10 to 35.

9. A method for reducing instrument breakage during shaping of a root canal, the method comprising using the endodontic instrument of claim 1 during the shaping.

* * * * *